(12) United States Patent
Urvantsau et al.

(10) Patent No.: US 12,498,308 B2
(45) Date of Patent: Dec. 16, 2025

(54) SYSTEMS AND METHODS FOR DETERMINING THE DISTILLATION CHARACTERISTICS OF PETROLEUM SAMPLES BY PARTIAL DISTILLATION

(71) Applicant: Instrumentation Scientifique de Laboratoire I.S.L., Verson (FR)

(72) Inventors: Viachaslau Urvantsau, Fontenay-le-Marmion (FR); Stephan Henri Leon Pignol, Clinchamps-sur-Orne (FR)

(73) Assignee: Instrumentation Scientifique de Laboratoire I.S.L., Verson (FR)

( * ) Notice: Subject to any disclaimer, the term of this patent is extended or adjusted under 35 U.S.C. 154(b) by 760 days.

(21) Appl. No.: 17/812,092

(22) Filed: Jul. 12, 2022

(65) Prior Publication Data

US 2023/0018630 A1 Jan. 19, 2023

Related U.S. Application Data

(60) Provisional application No. 63/221,281, filed on Jul. 13, 2021.

(51) Int. Cl.
*G01N 5/04* (2006.01)
*B01D 3/02* (2006.01)
(Continued)

(52) U.S. Cl.
CPC ............ *G01N 5/04* (2013.01); *G01N 33/28* (2013.01); *B01D 3/02* (2013.01); *G01G 7/02* (2013.01)

(58) Field of Classification Search
CPC .......... G01N 5/04; G01N 33/28; G01N 25/14; G01N 25/08; G01N 33/2829; G01G 7/02; B01D 3/42; B01D 1/0082; B01D 3/02
See application file for complete search history.

(56) References Cited

U.S. PATENT DOCUMENTS 3,135,107 A * 6/1964 Paulik ................. G01N 5/04
73/61.77
3,732,723 A * 5/1973 Goolsby ............ G01N 25/14
374/14
(Continued)

FOREIGN PATENT DOCUMENTS

CN 104897716 B 12/2017
CN 107315027 B 8/2018
FR 2410818 A1 6/1979

OTHER PUBLICATIONS

Computer translation of CN 104 897 716 B downloaded May 1, 2025.*

(Continued)

*Primary Examiner* — Randy W Gibson
(74) *Attorney, Agent, or Firm* — Snyder, Clark, Lesch & Chung, LLP

(57) ABSTRACT

A device may include a memory storing instructions and a processor configured to execute the instructions to determine an initial mass of a sample; distill the sample up to at least a thermal destruction temperature; record, at a set of time points during the distilling, vapor temperature values, liquid temperature values, and vapor pressure values associated with the sample; and determine a residual mass of the sample. The processor may be further configured to generate a pressure curve based on the vapor pressure values; calculate a summary integral surface for the generated pressure curve; and generate a distillation curve that relates the vapor temperature values and the liquid temperature values to mass percentage of the sample that has evaporated, based on the calculated summary integral surface, the initial mass of the sample, and the residual mass of the sample.

20 Claims, 9 Drawing Sheets

(51) Int. Cl.
*G01G 7/02* (2006.01)
*G01N 33/28* (2006.01)

(56) References Cited

U.S. PATENT DOCUMENTS

| | | | |
|---|---|---|---|
| 4,038,152 | A | 7/1977 | Atkins |
| 4,250,739 | A | 2/1981 | Audeh et al. |
| 4,528,635 | A | 7/1985 | Juodikis |
| 6,336,997 | B1 | 1/2002 | Inaba et al. |
| 6,581,443 | B2 | 6/2003 | Abaev et al. |
| 8,372,247 | B2 * | 2/2013 | Urvantsau ............... B01D 3/02 |
| | | | 202/160 |
| 10,106,751 | B2 | 10/2018 | Gong et al. |
| 10,363,495 | B2 * | 7/2019 | Urvantsau .......... G01N 33/2829 |
| 2005/0213633 | A1 | 9/2005 | Burian et al. |
| 2007/0050154 | A1 | 3/2007 | Albahri |
| 2011/0089016 | A1 | 4/2011 | Winkelaar et al. |
| 2018/0036648 | A1 | 2/2018 | Urvantsau et al. |
| 2019/0353604 | A1 | 11/2019 | Zimmermann et al. |

OTHER PUBLICATIONS

Computer translation of CN 107 315 027 B downloaded May 1, 2025.*
Computer translation of FR 2 410 818 A1 downloaded May 1, 2025.*
ASTM-D86-12 (Year: 2012).*
I. A. Dimudu, O. N. Jarkova, and G. N. Abaev, "Mathematical model of fractional distillation of petroleum products and its identification by experimental data", Inzynieria Chemiczna i Procesowa, 17, No. 4, 635 (1996). 10 pages.
M. R. Riazi, Characterization and Properties of Petroleum Fractions, 1st edition, ASTM stock No. MNL50 (2005), 25 pages.
PCT International Search Report and Written Opinion issued for the corresponding international application No. PCT/US2022/073646 mailed Sep. 23, 2022, 12 pages.

* cited by examiner

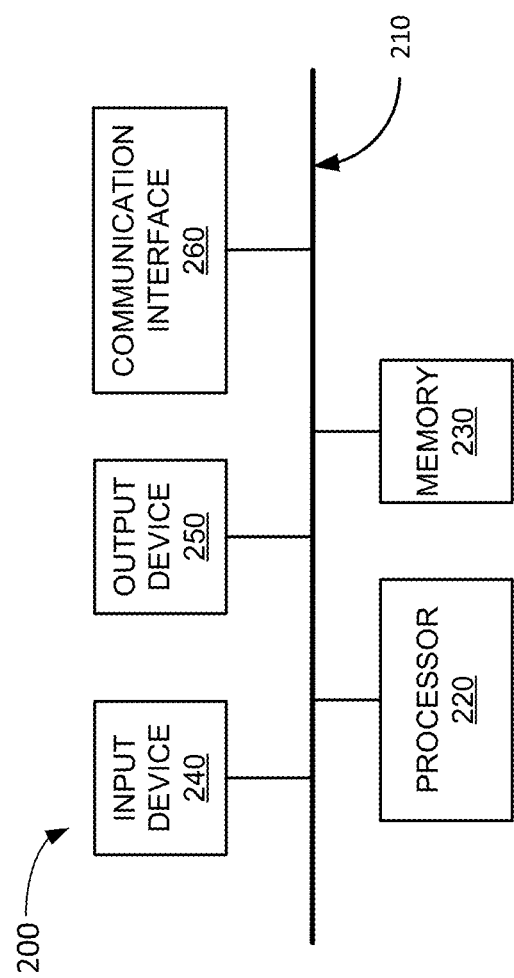

| SAMPLE ID 410 | INITIAL MASS 420 | RESIDUAL MASS 430 | 440 ••• | | | | | | 400 ••• |
|---|---|---|---|---|---|---|---|---|---|
| | | | TIME 442 | VAPOR TEMPERATURE 444 | LIQUID TEMPERATURE 446 | MEASURED PRESSURE 448 | ACTUAL PRESSURE 450 | DENSITY 452 | SUMMARY SURFACE 454 | MASS PERCENTAGE 456 |

FIG. 4

SYSTEMS AND METHODS FOR DETERMINING THE DISTILLATION CHARACTERISTICS OF PETROLEUM SAMPLES BY PARTIAL DISTILLATION

RELATED APPLICATION

This application claims priority and the benefit under 35 U.S.C. § 119(e) to U.S. Provisional Application No. 63/221,281 filed Jul. 13, 2021, the disclosure of which is hereby incorporated by reference herein in its entirety.

BACKGROUND INFORMATION

Petroleum products are used as a source of fuel in combustion engines. Different types of petroleum products have different constituents that exhibit different characteristics. Thus, different constituents may affect the performance of a petroleum product. A distillation process may be performed on a petroleum sample to determine various properties of the sample. Performing a distillation process and characterizing the results of the distillation process may pose various challenges.

BRIEF DESCRIPTION OF THE DRAWINGS

FIG. 2 illustrates exemplary components of a controller unit according to an implementation described herein;

FIG. 4 illustrates exemplary components of a distillation curve database according to an implementation described herein;

DETAILED DESCRIPTION OF PREFERRED EMBODIMENTS

Figure 1A:
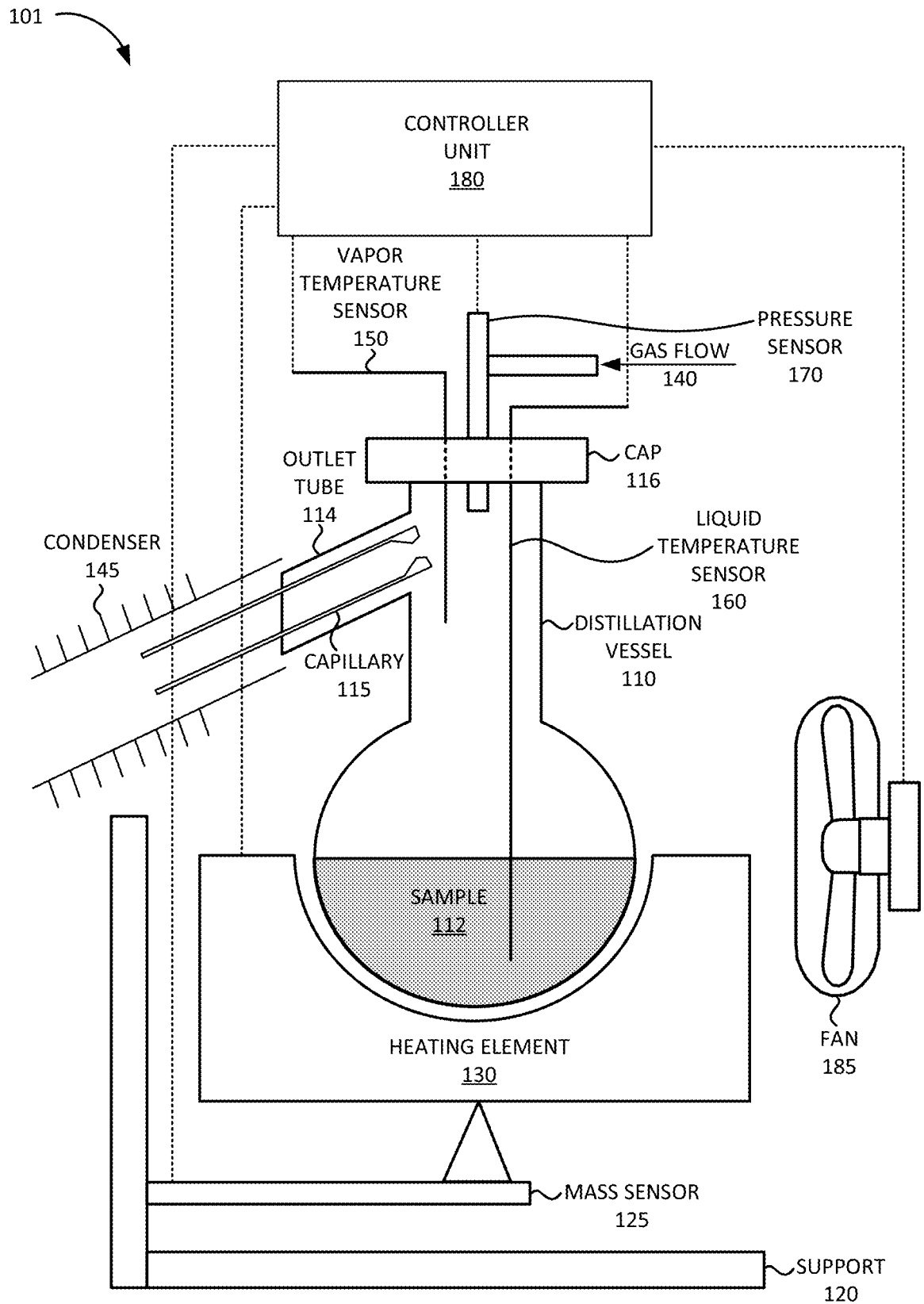
FIG. 1A illustrates a distillation device according to an implementation described herein.

The following detailed description refers to the accompanying drawings. The same reference numbers in different drawings identify the same or similar elements.

A distillation apparatus may be used to perform an automatic distillation of a petroleum sample. Data obtained during the distillation of the petroleum sample may be used to generate a distillation curve that relates one or more properties of the petroleum sample to temperature during the distillation. The distillation curve may then be used to select safe and reliable modes of transportation and storage, and/or to optimize a refinery process, for products associated with the petroleum sample.

The petroleum sample may be placed in a distillation flask and heated to an initial point of boiling. Sensors may monitor the temperature and pressure of the vapor and the temperature of the liquid. The heating of the sample may continue until the sample boils away or until some other end point is reached. One such endpoint may be the thermal destruction of the sample. Thus, the end distillation temperature may be higher than the thermal destruction temperature of the sample. The thermal destruction temperature of a petroleum sample may correspond to a temperature at which hydrocarbons, or other components of a petroleum sample, start to undergo chemical degradation through chemical reactions such as oxidation, depolymerization, chain scission, side-group elimination, and/or other types of chemical reactions that change the component composition of the petroleum sample.

One method to analyze the distillation properties of a heavy petroleum sample with a final distillation temperature higher than the thermal destruction temperature is to mix the heavy petroleum sample with a solvent and to distill the mixture. The distillation curve of the heavy petroleum sample may then be extracted from the data by comparing the obtained distillation curve to the distillation curve of the pure solvent. However, such a procedure is difficult and time-consuming for an operator to perform.

Implementations described herein relate to partial distillation of petroleum samples with end distillation temperatures higher than the thermal destruction temperatures. For example, the petroleum sample may include crude oil or another heavy petroleum product with a thermal destruction temperature of approximately 400° C. Furthermore, measurements collected during the distillation may be used to generate a distillation curve that relates temperature to mass percentage of sample that has distilled up to that temperature. In order to measure mass percentage of the sample, information relating to the mass of the sample may need to be obtained and used in generating the distillation curve.

Implementations described herein relate to a distillation device that includes a mass sensor to determine a mass of a petroleum sample during distillation. In some implementations, the mass sensor may be attached to an internal wall of the distillation device. In other implementations, the mass sensor may be external to the enclosure of the distillation device, such as, for example, being attached to an external wall of the distillation device.

Implementations described herein further relate to a method of determining an initial and residual mass of the petroleum sample during distillation and using the initial and residual mass to determine a mass percentage of sample at particular time points during the distillation. The method may include determining an initial mass of a sample; distilling the sample up to at least a thermal destruction temperature; recording, at a set of time points during the distilling, a set of vapor temperature values, a set of liquid temperature values, and a set of vapor pressure values associated with the sample; and determining a residual mass of the sample. The temperature and pressure values may be used to determine physical properties of the sample, such as, for example, the density of the liquid and/or the density of the vapors. The method may further include generating a pressure curve based on the set of vapor pressure values; calculating a summary integral surface for the generated pressure curve; and generating a distillation curve that relates the set of vapor temperature values and the set of liquid temperature values to mass percentage of the sample, based on the calculated summary integral surface, the initial mass of the sample, and the residual mass of the sample.

In order to generate an accurate pressure curve, determination of an initial moment of boiling may be required. Implementations described herein further relate to determining an initial moment of boiling during distillation of a petroleum sample, determining a final moment of boiling for the petroleum sample, and generating the pressure curve from the initial moment of boiling to the final moment of boiling. In some implementations, determining the initial moment of boiling may include identifying a time point during the distillation at which a vapor pressure value increases more than vapor pressure values typical of the zero line, by, for example, identifying a time point at which the vapor pressure value is greater, by at least a threshold amount, than a highest value of a set of vapor pressure values designated as zero-line values.

In other implementations, determining the initial moment of boiling may include identifying a time point during the distillation at which a vapor pressure noise value increases more than vapor pressure values typical of the zero line, by, for example, identifying a time point at which the vapor pressure noise value is greater, by at least a threshold amount, than a highest value of a set of vapor pressure values designated as zero-line values. In yet other implementations, determining the initial moment of boiling may include identifying a time point associated with a first positive extremum of a first derivative of vapor temperature with respect to time or a first positive extremum of a second derivative of vapor temperature with respect to time; or identifying a time point associated with a first negative extremum of a second derivative of liquid temperature with respect to time.

In some implementations, determining the final moment of boiling may include detecting a temperature fluctuation greater than a fluctuation threshold and determining that the thermal destruction has been reached based on detecting the temperature fluctuation greater than the fluctuation threshold.

Generating the distillation curve may include calculating, for each time point, a ratio of the calculated summary integral surface for the generated pressure curve to a summary integral surface for the generated pressure curve up to the time point, multiplied by a ratio of a difference between the initial mass of the sample and the residual mass of the sample to the initial mass of the sample. In some implementations, the distillation curve may be extrapolated using an extrapolation technique to generate a full distillation curve.

FIG. 1A illustrates a distillation device 101 according to an implementation described herein. Distillation device 101 illustrates an implementation with mass sensor 125 attached to a sidewall of distillation device 101. As shown in FIG. 1A, distillation device 101 may include a distillation vessel 110, a support 120, a mass sensor 125, a heating element 130, a condenser 145, a vapor temperature sensor 150, a liquid temperature sensor 160, a pressure sensor 170, a controller unit 180, and a fan 185.

Distillation vessel 110 may include a glass flask with a spherical shape to receive a sample 112, such as, for example, a liquid petroleum sample. Distillation vessel may include a cylindrical neck with a lateral outlet tube 114, a capillary 115 inside outlet tube 114 and configured to attach to condenser 145, and a cap 116 configured to seal distillation vessel 110. In some implementations, distillation vessel 110 may be sized to receive 5 to 15 milliliters (ml) of sample 112 to be analyzed via distillation. In other implementations, distillation vessel 110 may be sized to receive a different volume of sample.

Support 120 may include structural support of distillation vessel 110, mass sensor 125, and heating element 130. In some implementations, mass sensor 1125 may include a load cell, such as, for example, a strain gauge load cell, a piezoelectric load cell, a capacitive load cell, and/or another type of load cell that converts mechanical compression into an electrical signal. In other implementations, mass sensor 125 may include a different type of mass sensor, such as, for example, a microbalance. Heating element 130 may include a resistive heating element (or another type of heating element, such as a gas source and a flame, for example) to apply a controllable source of heat to sample 112. In some implementations, mass sensor 125 may be configured to measure the mass of distillation vessel 110 with sample 112 and cap 116, as well as heating element 130. In other implementations, distillation vessel 110 may be supported separately from heating element 130 and attached to support 120 (e.g., a wall of distillation device 101) via mass sensor 125. Thus, heating of distillation vessel 110 may be performed by heating the inside enclosed space of distillation device 101 and mass sensor 125 may measure the mass of distillation vessel 110 with sample 112 without including the mass of heating element 130 in the measurement.

Capillary 115 may include a tube (e.g., stainless steel tube, etc.) inside outlet tube 114 to receive the vapors during distillation. Capillary 115 may enable the creation of an overpressure in distillation vessel 110 during distillation vi gas flow 140. Condenser 145 may include a tube cooled by air cooling, liquid cooling, thermoelectric cooling (e.g., using Peltier modules, etc.), and/or another type of cooling process during distillation to condense the distilled vapors from sample 112 into a recovery receptable (not shown in FIG. 1).

Vapor temperature sensor 150 may include an inertialess temperature sensor, such as, for example, a thermocouple, a resistance temperature sensor, a thermistor temperature sensor, a semiconductor temperature sensor, and/or another type of temperature sensor. Vapor temperature sensor 150 is inserted into the neck of distillation vessel 110 through an opening in cap 116 to measure the vapor temperature of sample 112 during distillation.

Liquid temperature sensor 160 may include an inertialess temperature sensor, such as, for example, a thermocouple, a resistance temperature sensor, a thermistor temperature sensor, a semiconductor temperature sensor, and/or another type of temperature sensor. Liquid temperature sensor 160 may be inserted into distillation vessel 110 through an opening in cap 116 down to the lower portion of the spherical part of distillation vessel 110 and immersed in sample 112 to measure the liquid temperature of sample 112 during distillation.

Pressure sensor 170 may include a pressure sensor to measure the vapor pressure inside distillation vessel 110 during a distillation. Pressure sensor 170 may measure an overpressure in distillation vessel 110 during distillation due to passage of vapors through outlet tube 114, rather than an equilibrium pressure of vapor in distillation vessel 110. In some implementations, pressure sensor 170 may include a differential pressure sensor, such as, for example, a diaphragm with a piezoresistive, piezoelectric, and/or capacitive strain gauge. In other implementations, pressure sensor 170 may include another type of pressure sensor, such as an absolute pressure sensor. During distillation, gas flow 140 is applied into the neck of distillation vessel 110 during distillation to protect pressure sensor 170 from the hot vapors. Gas flow 140 may be provided via a micro-compressor (not shown in FIG. 1) controlled by controller unit 180 and may include ambient air, an inert gas, and/or another type of gas. For example, use of an inert gas may raise a maximum possible measuring temperature before thermal destruction occurs, due to a reduction in the oxidation of vapors in distillation vessel 110. Gas flow 140 provides a constant pressure during distillation that needs to be taken into account to determine the real pressure of the vapors. The pressure inside distillation vessel 110 may correspond to an overpressure relative to ambient pressure due to passage of vapors through the constricted aperture of capillary 115. Thus, the measured vapor pressure may depend not only on an equilibrium vapor pressure of evaporated sample 112 at a particular temperature, but also from the intensity of heating and the restricted flow through capillary 115. Therefore, the real pressure of the vapors is determined by subtracting a zero-line pressure value from the measured pressure.

Controller unit 180 may include a processor, microcontroller, and/or computer device that controls the operation of distillation vessel 110, collects measurements during a distillation, and generates a distillation curve based on the collected measurements. Exemplary components of controller unit 180 are described below with reference to FIGS. 2 and 3. Fan 185 may be operated at the end of a distillation to cool distillation vessel 110 after distillation of sample 112 has been completed.

Figure 1B:
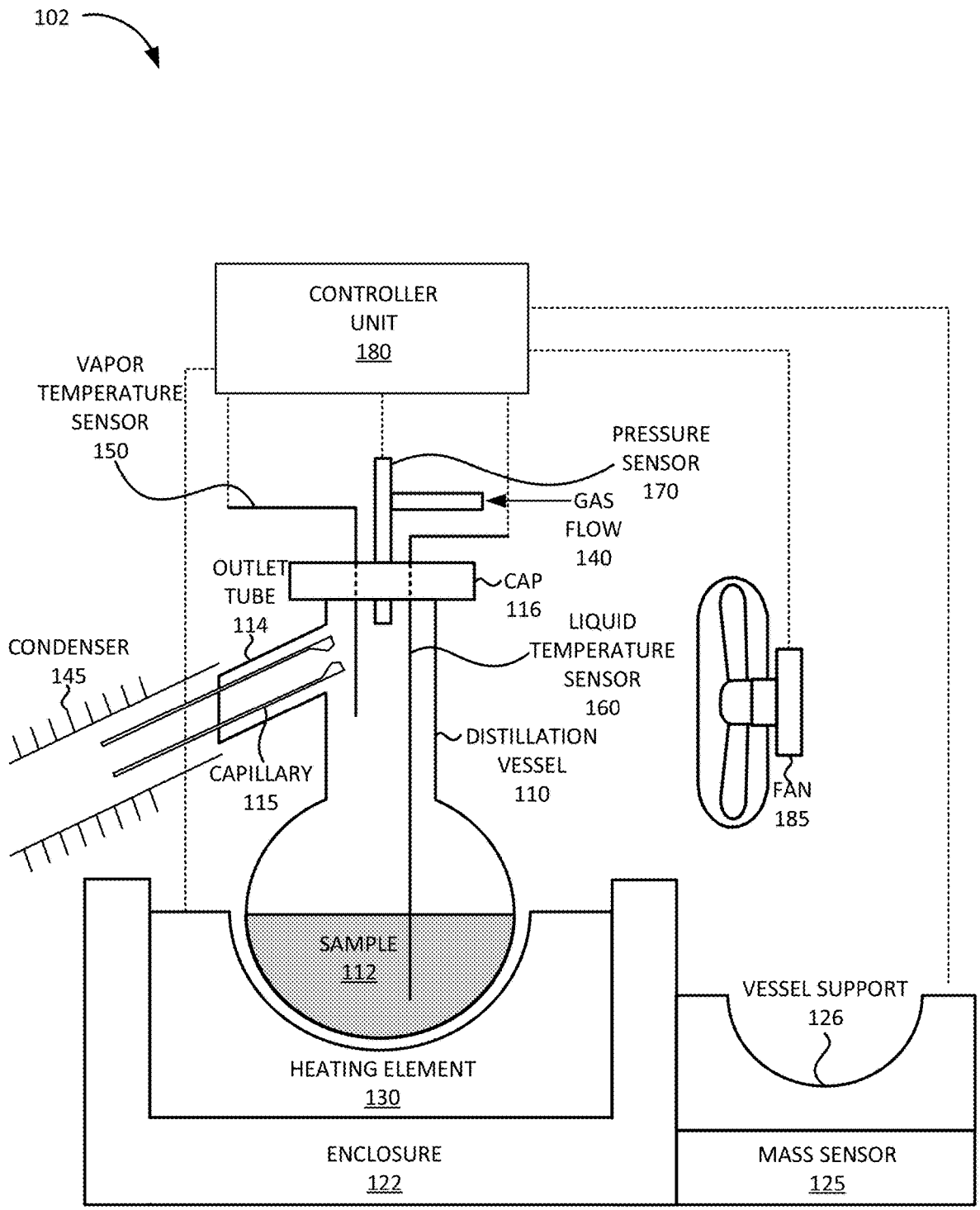
FIG. 1B illustrates a distillation device according to another implementation described herein.

FIG. 1B illustrates a distillation device 102 according to another implementation described herein. Distillation device 102 illustrates an implementation with mass sensor 125 being external to an enclosure 122 of distillation device 122. For example, mass sensor 125 may be attached to an external wall of enclosure 122.

As shown in FIG. 1B, distillation device 102 may include distillation vessel 110, enclosure 122, mass sensor 125, heating element 130, condenser 145, vapor temperature sensor 150, liquid temperature sensor 160, pressure sensor 170, controller unit 180, and fan 185. Enclosure 122 may enclose heating element 130 and support and/or partially enclose distillation vessel 110. Heating element 130, condenser 145, vapor temperature sensor 150, liquid temperature sensor 160, pressure sensor 170, controller unit 180, and/or fan 185 may function as described above with reference to FIG. 1A.

Mass sensor 125 may include a vessel support 126 to support distillation vessel 110 while the mass of sample 112 is being measured. The mass of sample 112 may be measured by placing distillation vessel 110 with sample 112 into vessel support 126 before distillation to measure an initial mass, placed onto heating element 130 to perform the distillation, and then placed back into vessel support 126 after distillation to measure a residual mass of sample 112 after distillation.

While distillation device 101 of FIG. 1A may enable measurement of the mass of sample 112 while distillation vessel 110 is in position for distillation, and may not require movement of distillation vessel 110 to measure the initial and residual mass of sample 112, distillation device 101 may require more complex construction. Distillation device 102 of FIG. 1B may require movement of distillation vessel 110 before and/or after distillation to measure mass of sample 112, but my enable an easier construction of distillation device 102. Although FIGS. 1A and B shows exemplary components of distillation device 101 and 102, in other implementations, distillation device 101 and/or 102 may include fewer components, different components, differently arranged components, or additional components than depicted in FIGS. 1A and 1B. Additionally, or alternatively, one or more components of distillation device 101 and/or 102 may perform functions described as being performed by one or more other components of distillation device 101 and/or 102.

FIG. 2 is a diagram illustrating example components of controller unit 180 according to an implementation described herein. As shown in FIG. 2, controller unit 180 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD), light emitting diode (LED) display, etc., for displaying content to the operator. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to performing a distillation process and generating a distillation curve based on results of the distillation process. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of controller unit 180, in other implementations, controller unit 180 may include fewer components, different components, additional components, or differently arranged components than depicted in FIG. 2. Additionally, or alternatively, one or more components of controller unit 180 may perform one or more tasks described as being performed by one or more other components of controller unit 180.

Figure 3:
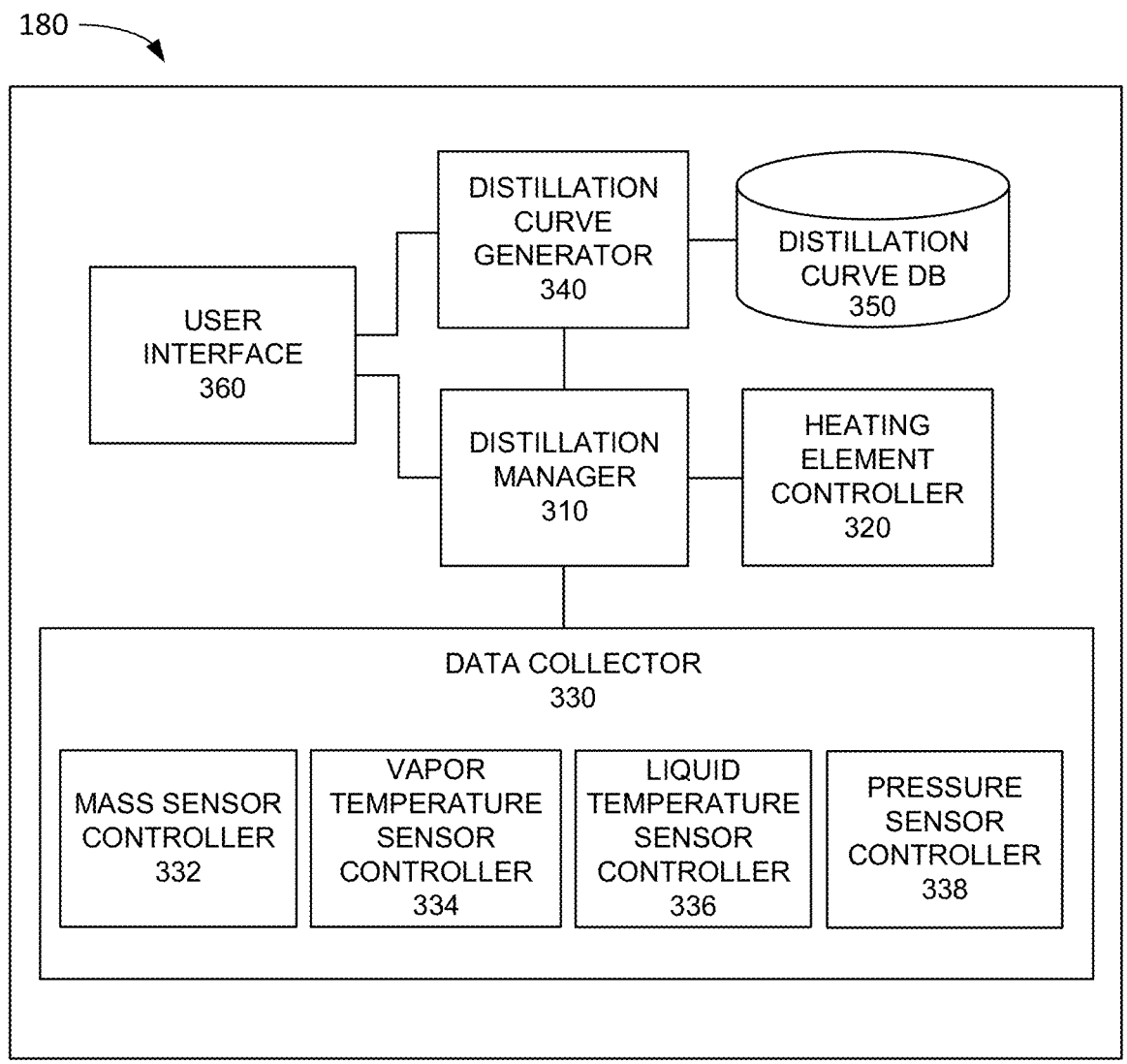
FIG. 3 illustrates exemplary functional components of a controller unit according to an implementation described herein.

FIG. 3 illustrates exemplary functional components of controller unit 180. The functional components of controller unit 180 may be implemented, for example, via processor 220 executing instructions from memory 230. As shown in FIG. 3, controller unit 180 may include a distillation manager 310, a heating element controller 320, a data collector 330, a distillation curve generator 340, a distillation curve database (DB) 350, and a user interface 360.

Distillation manager 310 may manage a distillation process for distillation device 101 or 102. For example, distillation manager 310 may initiate a distillation based on a request from a user received via user interface 360 via heating element controller 320. Heating element controller 320 may control heating element 130. Distillation manager 310 may obtain distillation data using data collector 330, generate a distillation curve using distillation curve generator 340, and provide the generated distillation curve to a user via user interface 360.

Data collector 330 may manage collection of data during a distillation. Data collector 330 may include a mass sensor controller 332, a vapor temperature sensor controller 334, a liquid temperature sensor controller 336, and a pressure sensor controller 338. Mass sensor controller 332 may control mass sensor 125. Vapor temperature sensor controller 334 may control vapor temperature sensor 150. Liquid temperature sensor controller 336 may control liquid temperature sensor 160. Pressure sensor controller 338 may control pressure sensor 170.

Distillation curve generator 340 may generate a distillation curve based on data obtained from data collector 330 and stored in distillation curve DB 350. Exemplary information that may be stored in distillation curve DB 350 is described below with reference to FIG. 4. Distillation curve generator 340 may determine an initial moment of boiling and a final moment of boiling from the distillation data and may generate a pressure curve from the initial moment of boiling to the final moment of boiling using the set of pressure values included in the distillation data. Distillation curve generator 340 may then calculate a total summary integral surface for the generated pressure curve and calculate, for each time point, a ratio of a summary integral surface up to the time point to the total summary integral surface, multiplied by a ratio of a difference between the initial mass of the sample and the residual mass of the sample to the initial mass of the sample to generate a mass percentage of the sample distilled up to the time point. Distillation curve generator 340 may then generate a distillation curve that relates temperature to mass percentage. In some implementations, distillation curve generator 340 may extrapolate the distillation curve using an extrapolation technique to generate a full distillation curve.

User interface 360 may include a user interface that enables a user to control distillation device 101 or 102 and/or receive information generate by controller unit 180, such as a generated distillation curve, messages regarding a distillation process that has been completed or is in progress, and/or other types of messages. User interface 360 may be configured to interact with input device 240 and/or output device 250.

Although FIG. 3 shows exemplary components of controller unit 180, in other implementations, controller unit 180 may include fewer components, different components, additional components, or differently arranged components than depicted in FIG. 3. Additionally, or alternatively, one or more components of controller unit 180 may perform one or more tasks described as being performed by one or more other components of controller unit 180.

FIG. 4 illustrates exemplary components of distillation curve DB 350. As shown in FIG. 4, distillation curve DB 350 may include one or more distillation records 400. Each distillation record 400 may store information relating to a particular distillation performed using distillation device 101 or 102. Distillation record 400 may include a sample identification (ID) field 410, an initial mass field 420, a residual mass field 430, and a distillation data table 440.

Sample ID field 410 may store an ID associated with a distillation. Initial mass field 420 may store an initial mass associated with the distilled sample (e.g., sample 112). Residual mass field 430 may store a residual mass associated with the distilled sample. Distillation data table 440 may store distillation data associated with the distillation of the sample. Distillation data table 440 may include a set of time point entries 440. Each time point entry 440 may store information relating to a particular time point during the distillation.

For example, time point entry 440 may include a time field 442, a vapor temperature field 444, a liquid temperature field 446, a measured pressure field 448, an actual pressure field 450, a density field 452, a summary surface field 454, and a mass percentage field 456. Time field 442 may store information identifying a particular time point. Vapor temperature field 444 may store a vapor temperature value associated with the particular time point. Liquid temperature field 446 may store a liquid temperature value associated with the particular time point. Measured pressure field 448 may store a measured vapor pressure value associated with the particular time point. The measured vapor pressure value may correspond to the overpressure in distillation vessel 110 during distillation due to passage of vapors through outlet tube 114. Actual pressure field 450 may store an actual vapor pressure field associated with the particular time point and computed by taking the difference between the measured pressure field associated with particular time point and an ambient pressure in distillation vessel 110 with gas flow 140.

Density field 452 may include a calculated vapor density value associated with the particular time point. Summary surface field 454 may store a summary integral surface value computed for the particular time point. Mass percentage field 456 may store a mass percentage value computed for the particular time point.

Although FIG. 4 shows exemplary components of distillation curve DB 350, in other implementations, distillation curve DB 350 may include fewer components, different components, additional components, or differently arranged components than depicted in FIG. 4.

Figure 5:
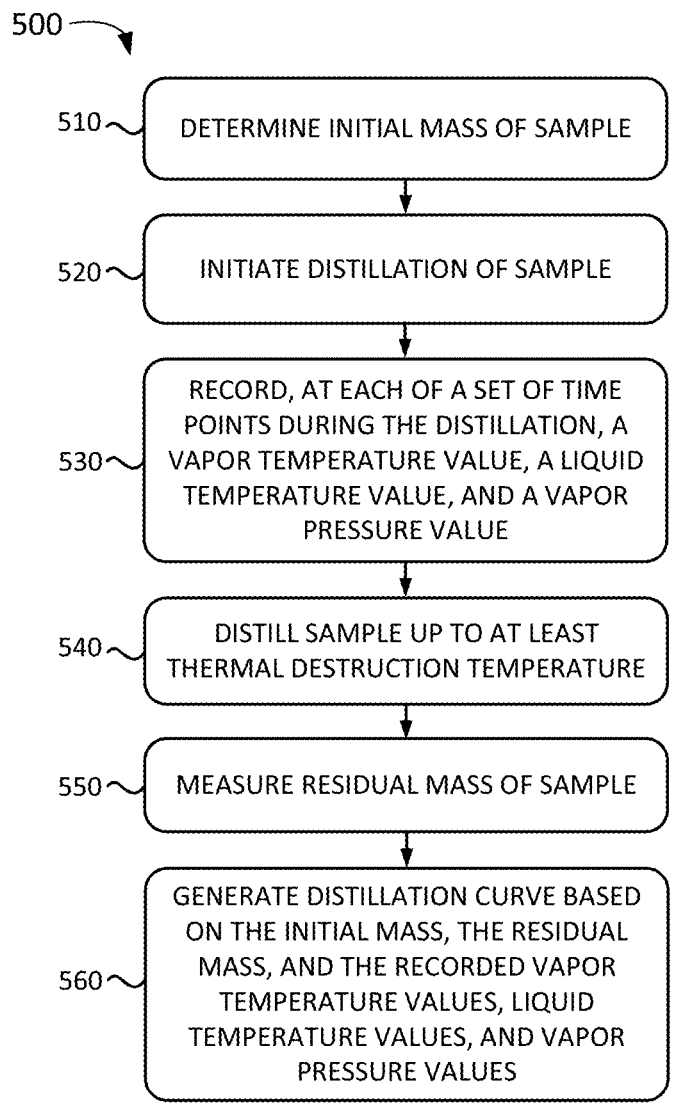
FIG. 5 is a flowchart of a process for performing a distillation according to an implementation described herein.

FIG. 5 is a flowchart of a process 500 for performing a distillation according to an implementation described herein. In some implementations, the process of FIG. 5 may be performed by, and/or using, distillation device 101 or 102. In other implementations, some or all of the process of FIG. 5 may be performed by, or using, another device or a group of devices separate from distillation device 101 and/or 102.

As shown in FIG. 5, process 500 may include determining an initial mass of a sample (block 510). For example, controller unit 180 may record an initial mass of sample 112 using mass sensor 125, after sample 112 is placed in distillation vessel 110. Process 500 may further include initiating distillation of the sample (block 520); recording, at each of a set of time points during the distillation, a vapor temperature value, a liquid temperature value, and a vapor pressure value (block 530); and distilling the sample up to at least the thermal destruction temperature (block 540). For example, controller unit 180 may initiate gas flow 140 and then initiate heating of distillation vessel 110 using heating element 130. Controller unit 180 may obtain vapor temperature values, liquid temperature values, and vapor pressure values using vapor temperature sensor 150, liquid temperature sensor 160, and pressure sensor 170, respectively.

Distillation may be continued until thermal destruction temperature is reached. In some implementations, thermal destruction may be determined through visual inspection by an operator. For example, an operator may observe distillation vessel 110 for changes in the color of the vapors being distilled, changes observed in sample 112, etc. In other implementations, thermal destruction may be detected automatically by controller unit 180 based on a fluctuation in temperature. For example, when thermal destruction temperature is reached, the vapor temperature, and/or the liquid temperature may stop rising and may start to fluctuate. Controller unit 180 may be configured to detect the fluctuation in vapor temperature and/or liquid temperature that are greater than a fluctuation threshold and to stop the distillation by ceasing to heat distillation vessel 110. Controller unit 180 may activate fan 185 to cool distillation vessel 110 at the end of the distillation.

Process 500 may further include measuring the residual mass of the sample (block 550). For example, controller unit 180 may record a residual mass of sample 112 using mass sensor 125, after distillation has ceased. Furthermore, process 500 may include generating a distillation curve based on the initial mass, the residual mass, and the recorded sets of vapor temperature values, liquid temperature values, and vapor pressure values (block 560). An exemplary process for generating the distillation curve is described below with reference to FIG. 6.

Figure 6:
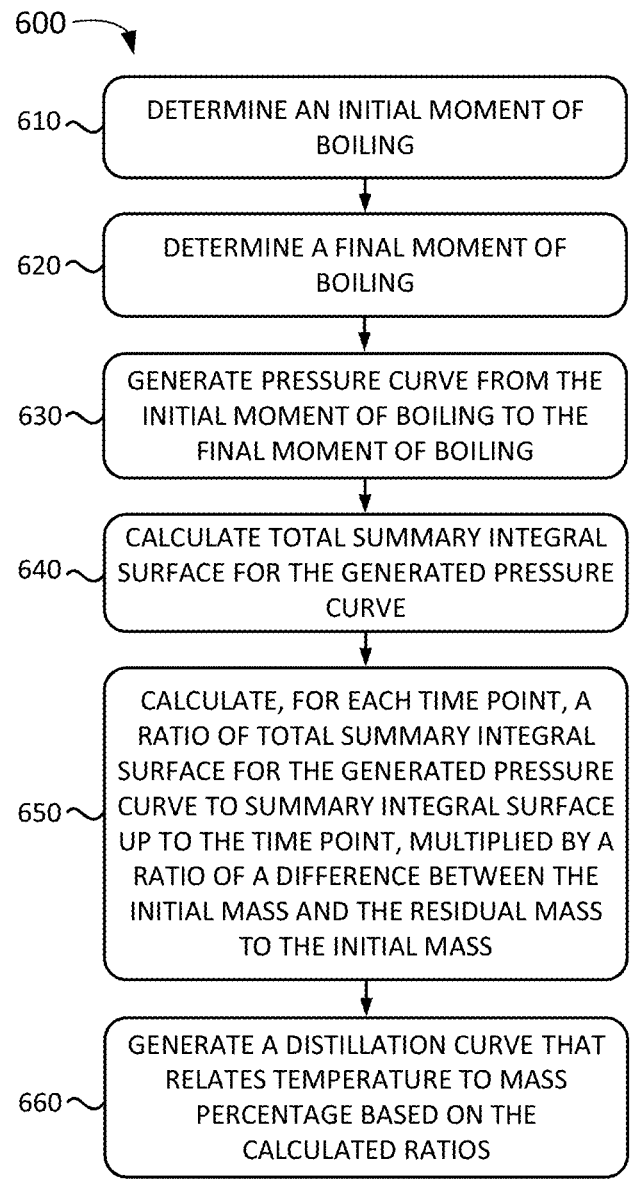
FIG. 6 is a flowchart of a process for analyzing results of a distillation according to an implementation described herein.

FIG. 6 is a flowchart of a process for analyzing results of a distillation according to an implementation described herein. In some implementations, the process of FIG. 6 may be performed by, and/or using, distillation device 101 or 102. In other implementations, some or all of the process of FIG. 6 may be performed by, or using, another device or a group of devices separate from distillation device 101 or 102.

As shown in FIG. 6, process 600 may include determining an initial moment of boiling (block 610), determining a final moment of boiling (block 620), and generating a pressure curve from the initial moment of boiling to the final moment of boiling (block 630). In some implementations, determining the initial moment of boiling may include identifying a time point during the distillation at which a vapor pressure value increases more than vapor pressure values typical of the zero line, by, for example, identifying a time point at which the vapor pressure value is greater, by at least a threshold amount, than a highest value of a set of vapor pressure values designated as zero-line values. A zero line in the data may be established, for example, by identifying data points associated with a slope within a particular range of zero slope line and/or by using another technique.

In other implementations, determining the initial moment of boiling may include identifying a time point during the distillation at which a vapor pressure noise value increases more than vapor pressure values typical of the zero line, by, for example, identifying a time point at which the vapor pressure noise value is greater, by at least a threshold amount, than a highest value of a set of vapor pressure values designated as zero-line values. In yet other implementations, determining the initial moment of boiling may include identifying a time point associated with a sharp increase in the vapor temperature. A sharp increase in the vapor temperature may be identifying based on identifying a first positive extremum of the first derivative of the vapor temperature $T_{vap}$ with respect to time t:

$$\frac{dT_{vap}}{dt};$$

based on identifying a first positive extremum of the second derivative of the vapor temperature $T_{vap}$ with respect to time:

$$\frac{d^2 T_{vap}}{dt^2};$$

and/or based on identifying a slowing down of the rate of temperature rise in the liquid, characterized by the first negative extremum of the second derivative of the liquid temperature $T_{liq}$ with respect to time: $T_{vap}$ with respect to time:

$$\frac{d^2 T_{liq}}{dt^2}.$$

In some implementations, determining the final moment of boiling may include detecting a temperature fluctuation greater than a fluctuation threshold and determining that the thermal destruction has been reached based on detecting the temperature fluctuation greater than the fluctuation threshold.

Process 600 may further include calculating a total summary integral surface for the generated pressure curve (block 640) and calculating, for each time point, a ratio of the total summary integral surface for the generated pressure curve to a summary integral surface up to the time point, multiplied by a ratio of a difference between the initial mass and the residual mass to the initial mass (block 650). For example, controller unit 180 may calculate the total summary integral surface $SS_m$ under the pressure curve, defined as:

$$SS_m = \int_{t=start}^{t=stop} P_{vap}^{0.5} * \rho_{vap}^{0.5} dt$$

where $P_{vap}$ corresponds to the vapor pressure, t corresponds to time, and $\rho_{vap}$ corresponds to the vapor density. The vapor density may be determined using the ideal gas law, for example, Once the total summary integral surface is determined, the mass percentage of evaporated sample at time point i may be calculated as:

$$\text{mass } \%_i = \frac{\int_{t=start}^{t=i} P_{vap}^{0.5} * \rho_{vap}^{0.5} dt}{\int_{t=start}^{t=stop} P_{vap}^{0.5} * \rho_{vap}^{0.5} dt} * \frac{(m_{init} - m_{res})}{m_{init}}$$

where $m_{init}$ corresponds to the initial mass and where $m_{res}$ corresponds to the residual mass.

Process 600 may further include generating a distillation curve that relates temperature to mass percentage of evaporated sample based on the calculated ratios (block 660). For example, controller unit 180 may generate the distillation curve by relating, for each time point i, the calculated mass % at time point i to the vapor temperature and liquid temperature at time point i.

Figure 7:
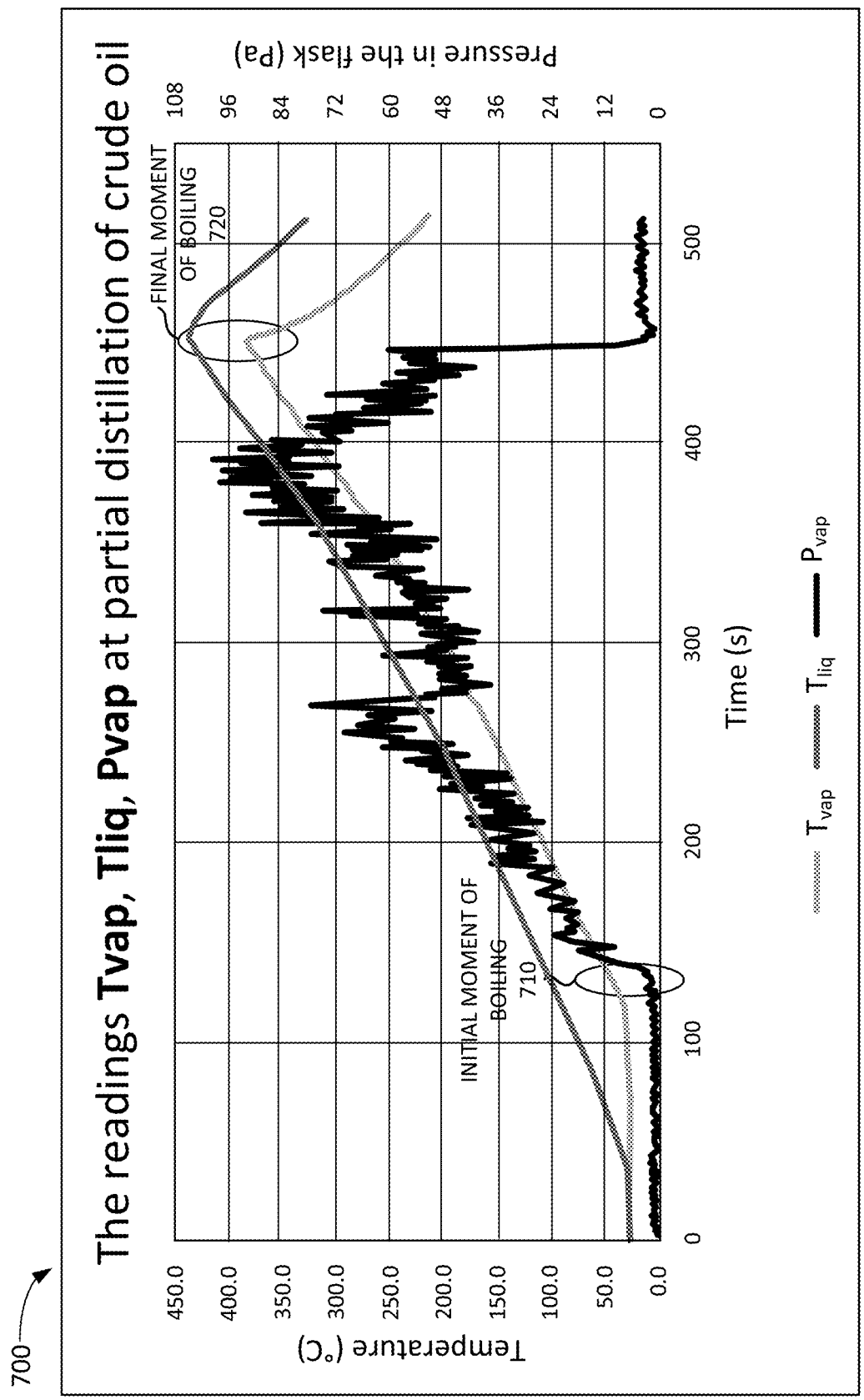
FIG. 7 illustrates an exemplary plot of distillation data according to an implementation described herein.

FIG. 7 illustrates an exemplary plot 700 of distillation data according to an implementation described herein. As shown in FIG. 7, plot 700 includes a plot of the vapor temperature values ($T_{vap}$), a plot of the liquid temperature values ($T_{liq}$), and a plot of the vapor pressure values ($P_{vap}$) obtained for a sample of crude oil with a final distillation temperature that is higher than the thermal destruction temperature. Plot 700 illustrates the initial moment of boiling 710 where the vapor pressure values start to rise above a zero-point line by at least a threshold amount. Furthermore, plot 700 illustrates a final moment of boiling 720 where the vapor temperature values and the liquid temperature values start to fall after initiation of thermal destruction.

Figure 8:
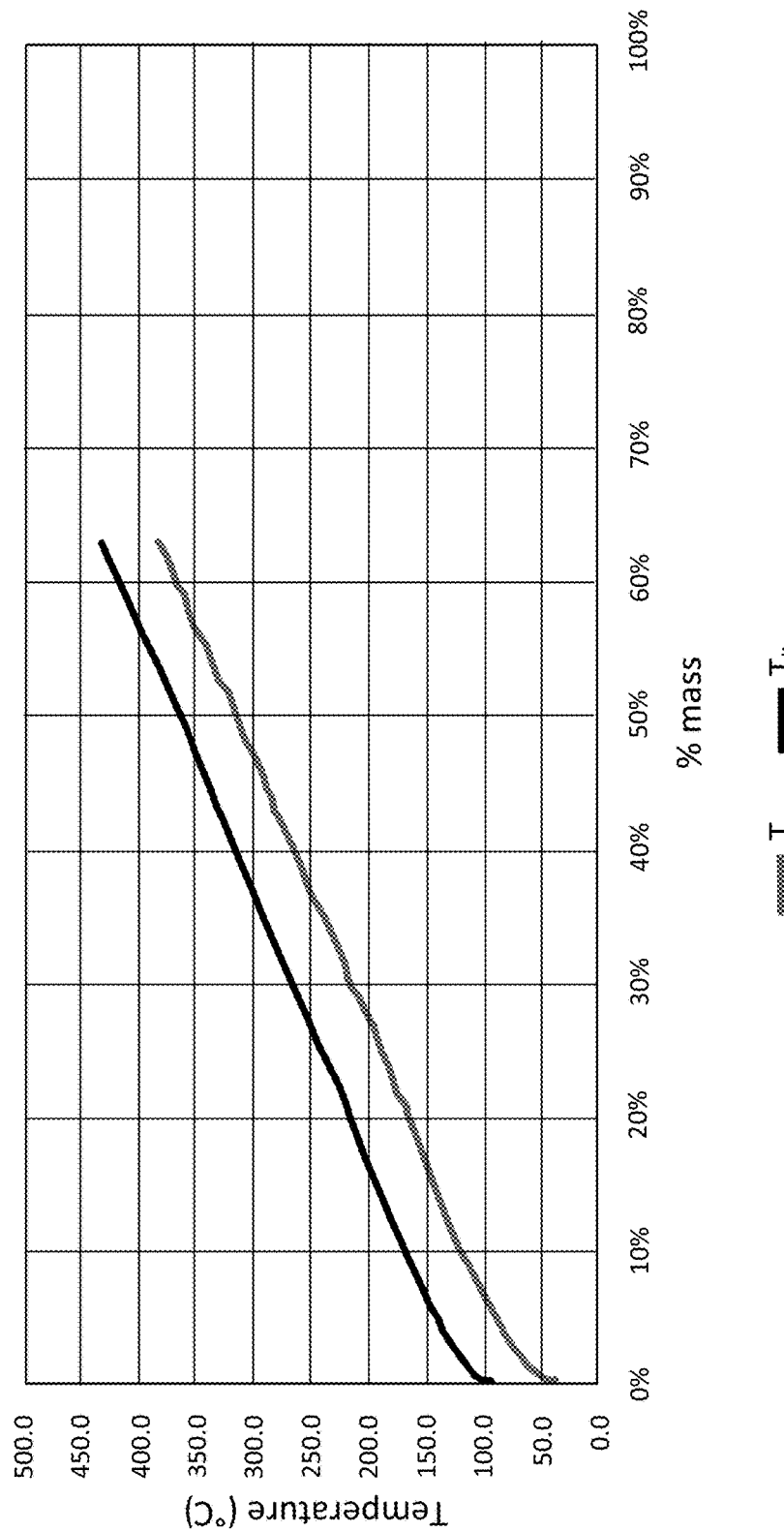
FIG. 8 illustrates an exemplary distillation curve according to an implementation described herein.

FIG. 8 illustrates an exemplary distillation curve 800 according to an implementation described herein. As shown in FIG. 8, distillation curve relates mass percentage of sample that has evaporated at a particular temperature. Distillation curve 800 illustrates a plot based on the vapor temperature values ($T_{vap}$) as well as a plot based on liquid temperature values ($T_{liq}$). As shown in FIG. 8, about 60% of the sample has boiled away or evaporated when thermal destruction temperature was reached, generating a partial distillation curve. In some implementations, the partial distillation curve may be extrapolated to generate a full distillation curve using an extrapolation technique, such as, for example, a Riazi Distribution Model extrapolation that uses the determined initial moment of boiling and parameters determined from the distillation curve using linear regression. Another extrapolation method that may be used is the Dimudu, Zharkova, and Abayev model of fractional distillation of petroleum products, which uses the initial moment of boiling, the end point moment of boiling, and a set of coefficients that characterize the distribution of components in the sample. The partial and/or full distillation curve may be used to optimizing a refinery process and/or for selecting a safe mode of transportation and/or storage, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5 and 6, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining an initial mass of a sample using a mass sensor;
    distilling the sample up to at least a thermal destruction temperature of the sample;
    determining, at a plurality of time points during the distilling, a plurality of vapor temperature values using a vapor temperature sensor, a plurality of liquid temperature values using a liquid temperature sensor and a plurality of vapor pressure values using a pressure sensor;
    determining a residual mass of the sample using the mass sensor;
    generating, by a processor, a pressure curve based on the plurality of vapor pressure values;
    calculating, by the processor, a summary integral surface for the generated pressure curve; and
    generating, by the processor, a distillation curve that relates the plurality of vapor temperature values and the plurality of liquid temperature values to mass percentage of the sample that has evaporated, based on the calculated summary integral surface, the initial mass of the sample, and the residual mass of the sample.

2. The method of claim 1, wherein calculating a summary integral surface for the generated pressure curve includes:
    determining an initial moment of boiling for the sample;
    determining a final moment of boiling for the sample; and
    generating the pressure curve from the initial moment of boiling to the final moment of boiling.

3. The method of claim 2, wherein determining the initial moment of boiling for the sample includes:
    identifying a time point, of the plurality of time points, associated with a vapor pressure value, of the plurality of vapor pressure values, that is greater, by at least a threshold amount, than a highest one of a set of vapor pressure values designated as zero-line values.

4. The method of claim 2, wherein determining the initial moment of boiling for the sample includes:
    identifying a time point, of the plurality of time points, associated with a vapor pressure noise value, of the plurality of vapor pressure values, that is greater, by at least a threshold amount, than a highest one of a set of vapor pressure values designated as zero-line values.

5. The method of claim 2, wherein determining the initial moment of boiling for the sample includes at least one of:
    identifying a time point, of the plurality of time points, associated with a vapor temperature value, of the plurality of vapor temperature values, that is associated with a first positive extremum of a first derivative of vapor temperature with respect to time or a first positive extremum of a second derivative of vapor temperature with respect to time; or
    identifying a time point, of the plurality of time points, associated with a liquid temperature value, of the plurality of liquid temperature values, that is associated with a first negative extremum of a second derivative of liquid temperature with respect to time.

6. The method of claim 1, further comprising:
    detecting a temperature fluctuation greater than a fluctuation threshold; and
    determining that the thermal destruction temperature has been reached based on detecting the temperature fluctuation greater than the fluctuation threshold.

7. The method of claim 1, wherein generating the distillation curve includes:
    calculating, for a particular time point, of the plurality of time points, a ratio of the calculated summary integral surface for the generated pressure curve to a summary integral surface for the generated pressure curve up to the particular time point, multiplied by a ratio of a difference between the initial mass of the sample and the residual mass of the sample to the initial mass of the sample.

8. The method of claim 1, further comprising:
    extrapolating the generated distillation curve to generate a full distillation curve.

9. The method of claim 1, wherein distilling the sample up to at least a thermal destruction temperature includes:
    heating the sample up to at least 400 degrees centigrade.

10. The method of claim 1, wherein the sample includes crude oil.

11. A device comprising:
    a memory storing instructions; and
    a processor configured to execute the instructions to:
        determine an initial mass of a sample using a mass sensor;
        distill the sample up to at least a thermal destruction temperature of the sample;
        determine, at a plurality of time points during the distilling, a plurality of vapor temperature values, a plurality of liquid temperature values, and a plurality of vapor pressure values;
        determine a residual mass of the sample using the mass sensor;
        generate a pressure curve based on the plurality of vapor pressure values;
        calculate a summary integral surface for the generated pressure curve; and
        generate a distillation curve that relates the plurality of vapor temperature values and the plurality of liquid temperature values to mass percentage of the sample that has evaporated, based on the calculated summary integral surface, the initial mass of the sample, and the residual mass of the sample.

12. The device of claim 11, wherein, when calculating a summary integral surface for the generated pressure curve, the processor is further configured to:
    determine an initial moment of boiling for the sample;
    determine a final moment of boiling for the sample; and
    generate the pressure curve from the initial moment of boiling to the final moment of boiling.

13. The device of claim 12, wherein when determining the initial moment of boiling for the sample, the processor is further configured to:
    identify a time point, of the plurality of time points, associated with a vapor pressure value, of the plurality of vapor pressure values, that is greater, by at least a threshold amount, than a highest one of a set of vapor pressure values designated as zero-line values.

14. The device of claim 12, wherein when determining the initial moment of boiling for the sample, the processor is further configured to:
    identify a time point, of the plurality of time points, associated with a vapor pressure noise value, of the plurality of vapor pressure values, that is greater, by at least a threshold amount, than a highest one of a set of vapor pressure values designated as zero-line values.

15. The device of claim 12, wherein when determining the initial moment of boiling for the sample, the processor is further configured to at least one of:
    identify a time point, of the plurality of time points, associated with a vapor temperature value, of the plurality of vapor temperature values, that is associated with a first positive extremum of a first derivative of vapor temperature with respect to time or a first positive extremum of a second derivative of vapor temperature with respect to time; or identify a time point, of the plurality of time points, associated with a liquid temperature value, of the plurality of liquid temperature values, that is associated with a first negative extremum of a second derivative of liquid temperature with respect to time.

16. The device of claim 11, wherein, when generating the distillation curve, the processor is further configured to:

calculate, for a particular time point, of the plurality of time points, a ratio of the calculated summary integral surface for the generated pressure curve to a summary integral surface for the generated pressure curve up to the particular time point, multiplied by a ratio of a difference between the initial mass of the sample and the residual mass of the sample to the initial mass of the sample.

17. The device of claim 11, wherein the processor is further configured to:

extrapolate the generated distillation curve to generate a full distillation curve.

18. The device of claim 11, further comprising:
a distillation flask comprising the mass sensor.

19. The device of claim 18, wherein the distillation flask further includes:

a vapor temperature sensor to obtain the plurality of vapor temperature values;

a liquid temperature sensor to obtain the plurality of liquid pressure values; and a pressure sensor to obtain the plurality of vapor pressure values.

20. A system comprising:
a controller configured to:
determine an initial mass of a sample;
distill the sample up to at least a thermal destruction temperature of the sample;
determine, at a plurality of time points during the distilling, a plurality of vapor temperature values, a plurality of liquid temperature values, and a plurality of vapor pressure values;
determine a residual mass of the sample;
generate a pressure curve based on the plurality of vapor pressure values;
calculate a summary integral surface for the generated pressure curve; and
generate a distillation curve that relates the plurality of vapor temperature values and the plurality of liquid temperature values to mass percentage of the sample that has evaporated, based on the calculated summary integral surface, the initial mass of the sample, and the residual mass of the sample; and a distillation device comprising:
a mass sensor to determine the initial mass and the residual mass of the sample;
a vapor temperature sensor to obtain the plurality of vapor temperature values;
a liquid temperature sensor to obtain the plurality of liquid pressure values; and
a pressure sensor to obtain the plurality of vapor pressure values.

* * * * *